3,365,678
LASER EMPLOYING PHOTOCHROMIC GLASS AS A Q-SPOILING MEDIUM

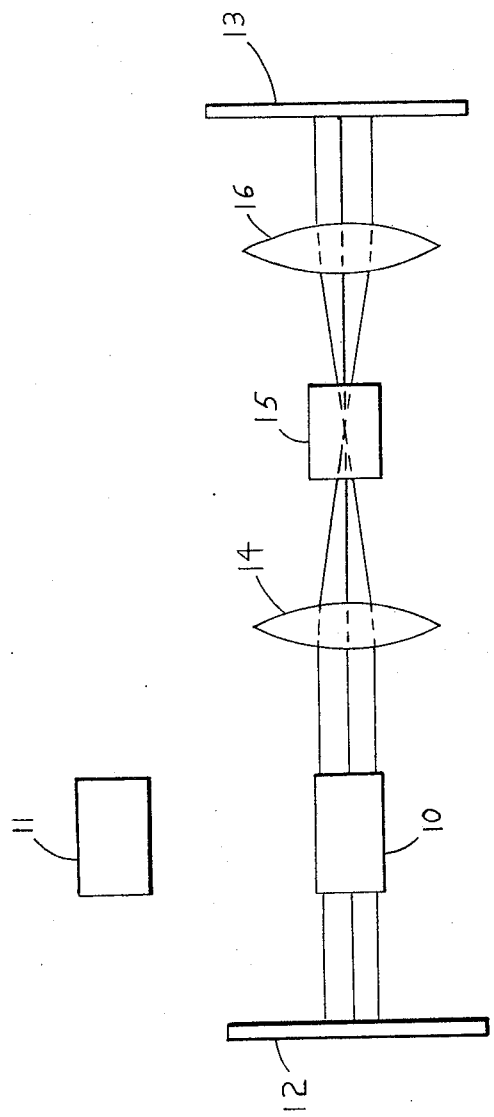

Robert D. Maurer, Painted Post, N.Y., assignor to Corning Glass Works, Corning, N.Y., a corporation of New York
Filed Jan. 28, 1964, Ser. No. 340,693
6 Claims. (Cl. 331—94.5)

ABSTRACT OF THE DISCLOSURE

A laser comprising a ruby rod and a source of pumping light, the rod being located between mirrors which define a resonating cavity. Within the cavity is a Q-spoiling element formed of photochromic glass having its ability to transmit radiation of a wavelength emitted by the ruby rod increasable by such radiation and decreasable by radiation of another wavelength.

---

This invention relates to lasers and more particularly to lasers employing novel means for effecting Q-spoiling in order to increase the power output thereof.

In order for high peak power output to be obtained from a laser, it is necessary that the amplifying element thereof be highly excited, i.e., pumped to near total population inversion, and that such excitation be emitted as output power in the form of a single pulse. Recent methods for effecting such increased output in pulsed lasers have employed modulation of feedback by means such as the rotation of external reflectors in order to reduce the quality factor Q of the laser resonator. The use of such a rotating reflector as one end of the resonator permits Q-spoiling at one reflector position by removing feedback of the laser output. When the laser has absorbed enough light from the pumping source to raise it to a very highly excited state, the mirror is returned to a position permitting reflectivity within the resonator, thereby enhancing Q and permitting oscillation to provide an increased peak power output. Another method of Q-spoiling which has been employed involves the use of an easily vaporized absorbing film within the resonator of a laser. The film absorbs initial stimulated emission, thereby effecting Q-spoiling until the initial emission destroys the film, thereby preventing absorption and allowing resonance.

The primary disadvantage of mechanical Q-spoiling by means of rotating reflectors is the need for cumbersome and bulky apparatus and extremely precise alignment. Disadvantages inherent in the use of vaporizable absorbing films include their inferior optical quality and the fact that the film must be replaced between each emission of the laser.

The present invention involves the discovery that certain glasses which exhibit the ability to darken under visible radiation of short wavelength and to increase in transparency when exposed to longer radiations can be employed as Q-spoiling means within a laser resonator. The use of such photochromic glasses as Q-spoiling components is illustrated in the accompanying drawing, which is a schematic diagram of a laser employing such a glass.

Referring to the drawing, in one embodiment a laser according to the present invention comprises a standard ruby rod 10 in conjunction with a osurce 11 of pumping light. Mirrors 12 and 13 define the ends of the resonator. A double convex converging lens 14 concentrates light emitted from rod 10 within a small area on previously darkened photochromic glass element 15.

Rod 10 absorbs light from pumping source 11, becoming excited thereby and storing the light. As the pumping light continues, amplification thereof becomes greater. Oscillation will occur when the light emitted from the laser rod is amplified by an amount greater than the absorption loss in the resonator. The light emitted from rod 10 resonates between mirrors 12 and 13, continuously increasing until the available energy is extracted from the resonator. Accordingly, the greater the absorption of energy by the photochromic glass, the greater the amplification in the laser must be before oscillation begins, and the greater is the energy stored by the laser. Due to the fact that the light emitted by the laser progressively bleaches the previously darkened photochromic glass, the absorption loss in the glass is progressively reduced, such that the net amplification becomes greater than required for oscillation, and the system becomes more unstable. Accordingly, oscillation increases at an even greater rate than before the bleaching of the glass and in turn causes further bleaching of the glass. In this way, the process cascades, and a pulse of light is released having an intensity greater than that which could have been obtained without the initial absorption and subsequent bleaching of the photochromic glass employed in the laser.

Converging lens 14 is utilized to concentrate the light emitted from rod 10 in order to increase the photochromic effect. Converging lens 16 is employed in order to re-collimate the light rays passing from photochromic glass 15 to mirror 13 after their convergence and crossing in the area of the photochromic glass element.

Photochromic glass element 15 preferably comprises a silicate glass body having in at least a portion thereof inorganic crystals which become darker in color upon exposure to actinic radiation of wavelength between 0.3 and 0.5 microns, the concentration of the crystals in the portion being at least 0.005 percent by volume. Due to the fact that such photochromic glass can be darkened by radiation of such wavelengths, which are within the range between blue and ultraviolet, after photochromic element 15 has been bleached by the longer wavelength radiations produced by the ruby laser, the glass can be re-darkened without disassembly of the laser by merely directing thereupon radiation within the above-mentioned range of wavelengths. Due to the fact that photochromic glasses can be produced having very high optical quality, the transmission of radiation thereby subsequent to the bleaching thereof is extremely efficient.

As previously mentioned, the photochromic glasses employed in the present laser generally comprise inorganic crystals contained in a silicate glass body. Such crystals may comprise silver chloride, silver bromide or silver iodide. The chracteristics and production of such glasses are described in the copending application of William H. Armistead and Stanley D. Stookey, Ser. No. 213,634, filed July 31, 1962 and assigned to the assignee of the present application, said co-pending application having issued as United States Patent 3,208,860. Other satisfactory compositions are described in the copending application of Roger J. Araujo, Serial No. 278,323, filed on May 6, 1963. Although all compositions disclosed in these applications may be employed as Q-spoil components in lasers according to the present invention, a particularly satisfactory composition for the photochromic glass component of such a laser comprises by weight approximately 58.27% $SiO_2$, 9.7% $Al_2O_3$, 19.4% $B_2O_3$, 10.9% $Na_2O$, 0.03% $K_2O$, 0.29% Cl, 0.79% F, 0.6% Ag, 0.016% CuO and 0.008% $Fe_2O_3$.

Although the use of converging lenses to concentrate radiation upon a localized area of the photochromic glass employed in the present laser increases the efficacy of the glass, such lenses are not necessary for the obtention of beneficial effects accruing from the glass.

The present invention is not limited to utilization in lasers employing rubies as their active elements, but can be utilized in all lasers emitting light at wavelengths within the range leading to bleaching of photochromic glass. In general, presently known photochromic glasses are bleached by radiation within the range 4,000 A. to 12,000 A.

Further variations may be made within the scope of the present invention, and, accordingly, it is intended that the scope of the invention be limited only by the scope of the apended claims.

I claim:

1. In a laser comprising an amplifying element situated between two reflecting means defining a resonator and means for exciting said amplifying element, the improvement which comprises a body comprising photochromic glass located within said resonator at a position to intercept radiation emitted by said amplifying element, said photochromic glass having its ability to transmit radiation of a wavelength emitted by said amplifying element increasable by radiation emitted by said amplifying element within a time period less than the lifetime of stimulated radiation in said amplifying element and decreasable by radiation other than that emitted by said amplifying element.

2. The improvement according to claim 1 in which said photochromic glass comprises a silicate glass body having in at least a portion thereof inorganic crystals which become darker in color upon exposure to actinic radiations of wavelengths between 0.3 and 0.5 microns, the concentration of said crystals in said portion being at least 0.005 percent by volume.

3. The improvement according to claim 1 in which said photochromic glass comprises a silicate glass body having in at least a portion thereof crystals of at least one silver halide selected from the group consisting of silver chloride, silver bromide and silver iodide, the concentration of said crystals in said portion being at least 0.005 percent by volume.

4. The improvement according to claim 1 which includes means within said resonator for concentrating radiation emitted by said amplifying element at a localized portion of said photochromic glass.

5. In a laser comprising an amplifying element situated between two reflecting means defining a resonator and means for exciting said amplifying element, the improvement which comprises a body comprising photochromic glass located within said resonator at a position to intercept radiation emitted by said amplifying element, the percentage of the total radiation emitted by said amplifying element which is transmitted by said photochromic glass being increasable by the action upon said photochromic glass of said radiation emitted by said amplifying element within a time period less than the lifetime of stimulated radiation in said amplifying element and decreasable by the action upon said photochromic glass of radiation differing from said radiation emitted by said amplifying element.

6. The improvement according to claim 5 which includes means within said resonator for concentrating said radiation emitted by said amplifying element at a localized portion of said photochromic glass.

References Cited
UNITED STATES PATENTS 3,208,860 8/1965 Armistead et al. ____ 350—160
3,289,099 11/1966 Masters _____ 331—94.5

JEWELL H. PEDERSEN, *Primary Examiner.*

W. L. SIKES, *Assistant Examiner.*